United States Patent

Karrfalt

[11] Patent Number: 5,843,552
[45] Date of Patent: Dec. 1, 1998

[54] MULTICOMPONENT SELF-SEALING SEAM TAPE

[75] Inventor: H. Alan Karrfalt, Noblesville, Ind.

[73] Assignee: Bridgestone/Firestone, Inc., Akron, Ohio

[21] Appl. No.: 70,638

[22] Filed: Jun. 1, 1993

Related U.S. Application Data

[63] Continuation of Ser. No. 837,308, Feb. 18, 1992, abandoned.

[51] Int. Cl.$^6$ ........................................................ B32B 3/00
[52] U.S. Cl. .................................................. 428/57; 428/58
[58] Field of Search .................................. 428/57, 58, 59, 428/60, 61, 343

[56] References Cited

U.S. PATENT DOCUMENTS

| | | |
|---|---|---|
| 4,113,799 | 9/1978 | Van Ornum et al. . |
| 4,398,982 | 8/1983 | Witerski et al. ...................... 428/58 X |
| 4,563,379 | 1/1986 | Kruger . |
| 4,588,637 | 5/1986 | Chiu . |
| 4,601,935 | 7/1986 | Metcalf et al. . |
| 4,654,098 | 3/1987 | Miller ...................................... 428/57 X |
| 4,767,653 | 8/1988 | Renstrom . |
| 4,849,268 | 7/1989 | Backentow . |
| 4,855,172 | 8/1989 | Chiu . |
| 4,885,887 | 12/1989 | Simmons et al. . |
| 4,910,059 | 3/1990 | Sancaktar ............................... 428/60 X |
| 4,936,071 | 6/1990 | Karrfalt . |
| 5,006,191 | 4/1991 | Schmidt ................................. 428/58 X |
| 5,006,385 | 4/1991 | Cheung et al. ............................. 428/57 |
| 5,084,119 | 1/1992 | Barksdale ............................... 428/57 X |
| 5,093,171 | 3/1992 | Sheahan ..................................... 428/61 |
| 5,260,111 | 11/1993 | Valaitis et al. ......................... 428/58 X |

*Primary Examiner*—Daniel Zirker
*Attorney, Agent, or Firm*—Frank J. Troy, Sr.

[57] ABSTRACT

A sealing tape for sealing linear seams formed by adjacent substrate sheets comprises two laterally spaced linear strips interconnected with an intervening linear center strip. The center strip comprises a soft, pliable, adhesive sealant material adapted to flow into the substrate seam upon application of heat and pressure to the sealing tape. The laterally spaced side strips are dimensionally stable and comprised of a tacky elastomeric compound adapted to adhere to the substrate under applied heat and pressure.

6 Claims, 2 Drawing Sheets

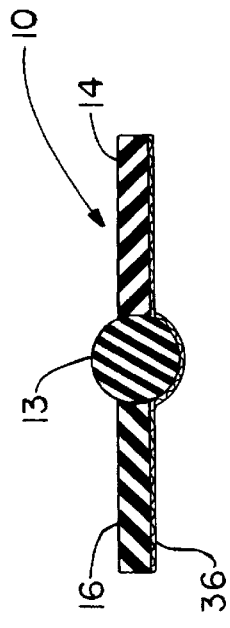
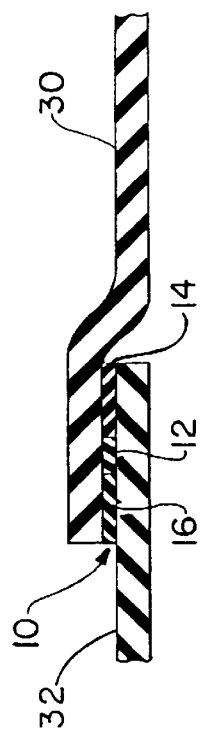
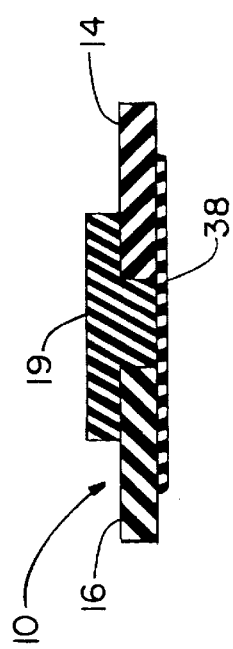
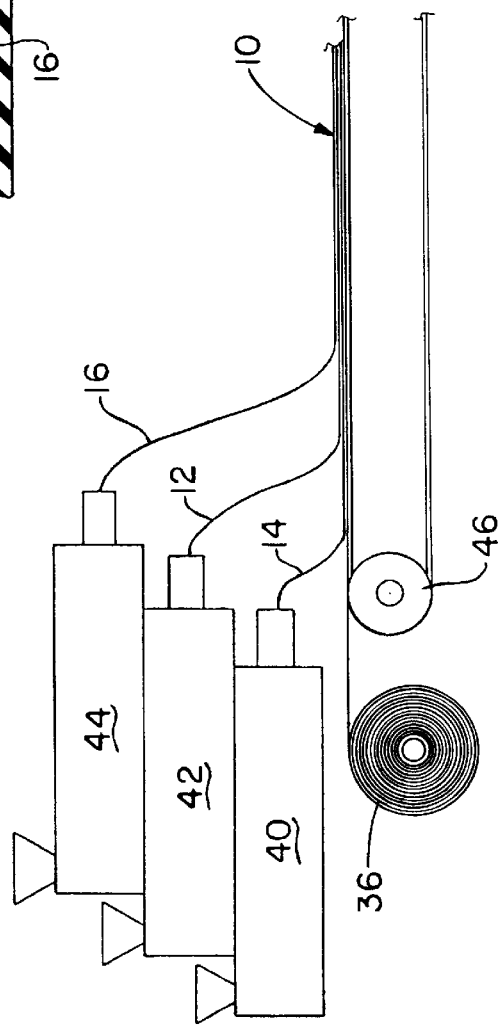

MULTICOMPONENT SELF-SEALING SEAM TAPE

This application is a file wrapper continuation of application Ser. No. 07/837,308, filed on Feb. 18, 1992, by Henry A. Karrfalt, now abandoned, for MULTICOMPONENT SELF-SEALING SEAM TAPE.

FIELD OF THE INVENTION

The present invention relates to sealing seam tape and more specifically to a preformed sealing tape particularly useful for sealing lapped or butted joints typically formed by flat roofing materials.

BACKGROUND OF THE INVENTION

Roofing membranes applied to roofs in the field produce a lap seam between adjacent lapping membranes. The lap seams are referred to as "field seams" and conventionally are adhered together by liquid contact adhesive which normally flows between adjacent membranes, but frequently does not completely fill all voids and other imperfections in the lap seam between membrane sheets. The field seam can be subsequently sealed with a lap sealant applied over the seam step-off. Similarly, factory-produced roofing membranes contain factory seams between adjacent membrane strips which likewise require a cover strip to seal the factory-formed, closed lap seam joint between adjacent membrane sheets. Both field seams and factory seams require tape sealants to assure watertight seams.

Tape sealants typically are tacky, deformable solid materials normally supplied in a roll with a release paper interlay to prevent interface sticking. Sealing seam tapes are applied under compression to seal linear seams formed by lap joints, abutting joints, or other discontinuous connections between two or more fixed substrate surfaces of similar or dissimilar materials. Typical substrates are building roofing materials and particularly sheets of elastomeric membranes. Commercial membrane roofing materials comprise EPDM (ethylene propylene diene copolymer) or neoprene, which are typically supplied in sheets spliced together to form a continuous roofing sheet. Linear seams are formed by lap joints between sheets typically used to splice the laterally adjacent sheets together where the adjacent sheets are overlapped at the edges being joined. Exterior seam tapes for covering the seams have been proposed to avoid cumbersome and often inadequate adhesive application between the lapped surfaces.

Interface adhesives or sealants are shown in U.S. Pat. Nos. 4,588,637, 4,855,172, 4,849,268, 4,885,887, 4,936,071, and 5,084,119. Pre-positioned sealing tapes interposed between lapped roofing membranes are shown in U.S. Pat. Nos. 4,601,935 and 4,767,653. A sealing tape for flanges is disclosed in U.S. Pat. No. 4,732,635, while a sealing web for overlapping edges or abutting joints is disclosed in U.S. Pat. No. 4,563,379.

In U.S. Pat. No. 4,563,379, a two-layer elastic tape seals the seam between adjacent web roofing membranes. The two-layer sealing tape structure consists of an upper layer containing vulcanized EPDM and reinforcing resin in combination with a lower layer of sealing tape material.

Preformed prior art sealing tapes, however, provide inadequate peripheral strength and are further deficient in respect to sealing the seam connection due to insufficient sealing of the seam which in turn causes leaks and inadequate joint sealing.

A particular problem with prior art tapes used to seal field seams is that the solid tape does not flow to fill voids or other discontinuities in the lap joints or step-offs. These voids and other imperfections lack watertightness and are particularly apparent in T-joint seams where three sheets of elastomeric membrane are lapped together and produced by a third sheet layered over two parallel seamed sheets. The T-joint is not watertight because of the multiple lapping and the channel created by the third sheet layered over the two parallel lapped sheets. The watertightness problem increases with thickness of the membrane sheets where thicker membranes are more difficult to render water-tight.

Both field seams and factory seams require roofing tapes to seal the membrane joints and particularly to fill voids, discontinuities, T-joints, step-offs and similar imperfections which normally occur in the mating seams of the membranes. The sealing tape of the present invention provides an excellent lap seam sealant tape or cover strip which can be used over roofing membrane seams. Prior art sealants such as caulk do not weather well and readily crack upon exposure to weather and sun. The roofing tape of the present invention provides an excellent sealant, is weather-resistant, and is easily applied over a closed seam.

SUMMARY OF THE INVENTION

An improved self-sealing tape comprising a pair of laterally spaced, high strength, reinforced sealing edge components interconnected with a flexible, flowable, generally raised center component which provides high peripheral strength to the sealing tape in conjunction with excellent seam sealing due to the flowable seam center. The flowable center seam comprises an enlarged thickness consisting of uncured adhesive sealant resin ribbon adapted to become fluid-like and flow under heat and minor pressure, if desired, to effectively seal the abutting or lapping substrate joints as well as the linear seams along with other substrate gaps and imperfections. The outer edge components of the sealing tape provide strength and structural integrity while the soft, flowable center functions to provide sealing watertight integrity to the sealed seam. These and other advantages of the multicomponent self-sealing tape of the present invention will become more apparent by referring to the representative drawings, the detailed description, and the illustrative example of the invention.

BRIEF DESCRIPTION OF THE DRAWINGS

FIG. 6 is a cross-sectional elevational view of an alternative profile of the multicomponent sealing tape of this invention;

FIG. 7 is an alternative profile cross-sectional view of a sealing tape similar to FIG. 4;

FIG. 8 schematically illustrates an extrusion process for producing the multicomponent tape of this invention; and FIG. 9 is a cross-sectional elevational view of a lap joint sealed by the multicomponent sealing tape of the present invention.

DETAILED DESCRIPTION OF THE INVENTION

Figure 1:
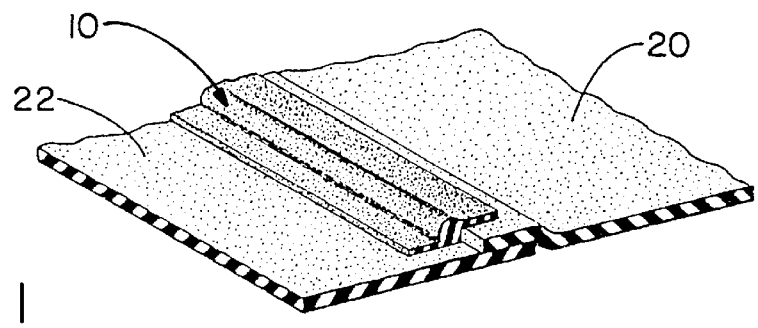
FIG. 1 is a perspective view of a lap joint sealed by the multicomponent sealing tape of the present invention.

Referring now to the drawings, a multicomponent sealing tape 10 of the present invention, having a raised center profile, is shown to seal various types of linear seams between adjacent substrate materials.

Figure 2:
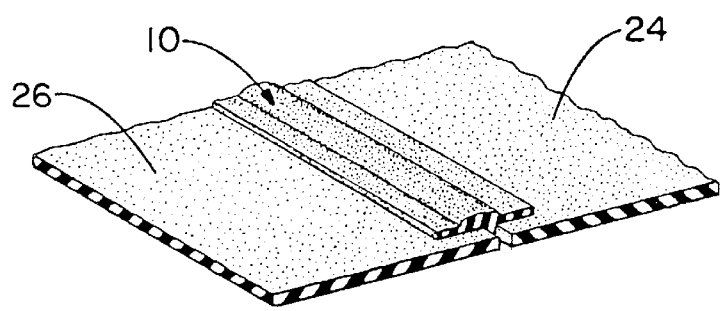
FIG. 2 is a perspective view of a butt joint sealed by the multicomponent sealing tape of the present invention.
Figure 3:
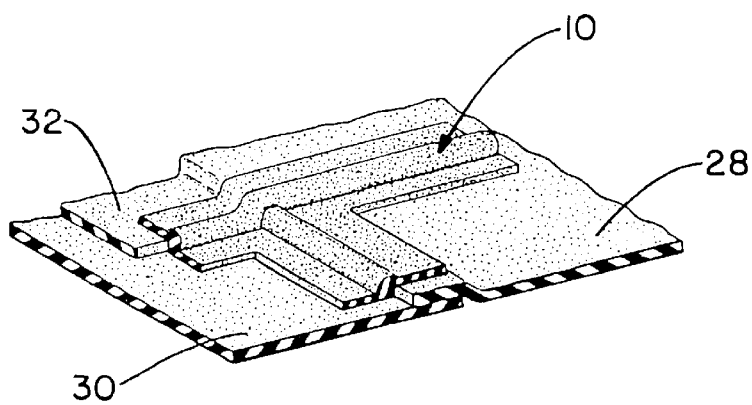
FIG. 3 is a perspective view of a T-joint sealed by the multicomponent sealing tape of the present invention.

In FIG. 1, the sealing tape 10 seals adjacently disposed lapped substrates 20,22 shown in a partial sectional perspective view, while FIG. 2 similarly shows in sectional perspective the sealing tape 10 sealing adjacently located abutted substrates 24,26. FIG. 3 similarly shows a T-joint comprising lapped substrates 28,30 which are both overlapped by a top substrate 32.

Figure 4:
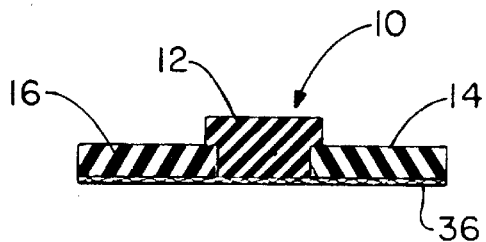
FIG. 4 is an enlarged cross-sectional elevation profile view of the multicomponent sealing seam tape of the present invention.
Figure 5:
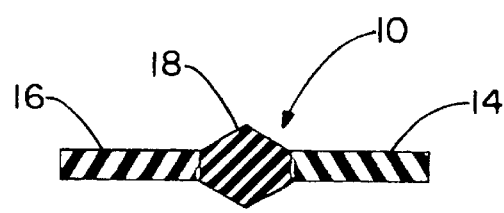
FIG. 5 is a cross-sectional elevational view of an alternate profile of the multicomponent sealing tape of the present invention, particularly suitable for sealing lap seam joints.

FIGS. 4 through 7 and 9 are cross-sectional views of various configurations of the multicomponent tape 10 of the present invention. In FIG. 4, the linear sealing tape 10 is an elongated linear strip of the desired length to seal a given seam and generally comprises a raised profile, linear central strip 12 interposed and interconnected between laterally spaced, linear side strips 14,16. The elongated sealing tape 10 can be a continuous elongated strip, supplied in a wound coil and cut to length as needed, or it can be supplied in precut linear lengths. In either case, silicone-coated release paper 36 ordinarily is interposed between vertical layers to prevent interface sticking between adjacent coils or precut strips. The thickness of the central strip 12 is preferably enlarged in comparison to the thickness of both side strips 14,16. The shape of the enlarged central strip can comprise various raised profile configurations such as an arcuate shape 13, shown in FIG. 7, or a polygonal (e.g., a hexagon) shape 18, shown in FIG. 5, or a T-shape 19, shown in FIG. 6, as well as other enlarged similar configurations. As seen in FIG. 9, the shape of the central strip is generally shown in the form of a rectangle and, in association with side strips 14,16, bonds adjacently disposed lap substrates 30,32 together.

Typical sealing tapes are about ½ to 4 inches wide and are about 20 to 40 mils thick measured on the linear side strips 14,16 with the enlarged or raised middle or central strip component 12, 13, 18, or 19 being at least about 10 percent thicker than the side strips 14,16. Preferred lap sealant tapes are about 1 to 3 inches wide with each side strip being 0.75 to 1.5 inches wide and 20 to 40 mils thick with raised center strip 12, 13, 18, or 19 being about 25 to 45 mils thick and about 0.375 to 1 inch wide.

FIG. 6 illustrates a multicomponent lap sealant tape 10 with a T-shaped, soft center strip 19 and side strips 14,16 further supported by a top cover strip 38 where the tape 10 is inverted in use and the elastomer cover 38 is the exposed surface. The cover strip 38 is a resilient EPDM elastomeric material comparable or the same as used in the joined substrates.

The linear center strip 12, 13, 18, or 19 comprises a flowable sealant of uncured resin material interposed between non-flowable, dimensionally stable, cured elastomeric linear side strips 14,16. The flowable, uncured center component 12, 13, 18, 19 is a soft, pliable material and relatively stable prior to use, but will readily fluidize and flow out when applied to a substrate seam under heat in accordance with the present invention. When applied to a substrate linear seam, the flowable center component flows into the seam formed between adjacent substrates to impart watertightness integrity to the sealed seam. For instance, enlarged flowable central component will flow downwardly and penetrate into a linear seam comprising the butt joint formed by abutting EPDM membrane substrates 24,26, as shown in FIG. 2. Similarly, the enlarged central component will flow laterally into a linear lap seam comprising the lap joint formed by adjacently overlapped substrates 20,22, as shown in FIG. 1. Any gaps or grooves or other imperfections proximate the linear seam will be securely sealed by the flowing center strip 12, 13, 18, or 19 material when applied under heat to the substrate.

The multicomponent sealing tape 10 of the present invention preferably comprises an uncured, flowable sealant adhesive resin as the soft pliable linear center strip 12, 13, 18, or 19. Preferred flowable sealant adhesive resin compositions comprise butyl rubber copolymers including halogen butyl rubbers where the butyl rubbers are copolymers of an isoolefin with minor amounts of conjugated diolefin, such as isobutylene copolymerized with 0.5 percent to 5 percent isoprene. Suitable flowable sealant adhesives contain isobutylene copolymerized with 0.5 percent to 30 percent by weight of an open chain diolefin such as isoprene; 1,3-butadiene, piperylene; 2,3-dimethyl-1,3-butadiene; 1,2-dimethyl-1,3-butadiene; 1,3-dimethyl-1,3-butadiene; 1-ethyl-1,3-butadiene (hexadiene-1,3); and 1,4-dimethyl-1,3-butadiene(hexadiene-2,4), as more particularly disclosed in U.S. Pat. Nos. 4,588,637 and 4,855,172, and hereby fully incorporated by reference. Useful polyisobutyl rubber copolymers have a molecular weight between about 10,000 and 100,000 although the preferred molecular weight range is from about 10,000 to 15,000 with a most preferred molecular weight range between about 10,000 and 11,000. Alternatively, the butyl rubber copolymers can have molecular weights above 100,000 if a crosslinkable butyl rubber is compounded with softening agents or solvents and without a curing system. The butyl rubber copolymer ordinarily is intermixed with conventional or desirable additives such as a tackifier, pigment, oxidizer, inert filler, or a softener to form the flowable sealant adhesive component 12, 13, 18, or 19. Useful tackifiers include thermoplastic olefins, isoparaffins, terpene polymers, and methyl styrene copolymers as disclosed in U.S. Pat. No. 4,113,799. Useful oxidizing agents include organic peroxides with benzoyl peroxide being preferred. Pigments include carbon black and titanium dioxide or other opacifying pigments, while mineral reinforcing fillers can include zinc oxide, aluminum hydrate, lithophone, clays, hydrated silicas, calcium silicate, magnesium oxide, magnesium carbonate and similar reinforcing agents. A crosslinking agent is not used. Useful levels of carbon black are between about 3 percent to 15 percent while useful levels of silica are between about 1 percent to 5 percent based on the weight of polymeric resin.

The flowable adhesive sealant component 12, 13, 18, or 19 can be slightly flowable, but is otherwise relatively stable at room temperature. With increases in temperature, the resinous sealant component increases in flowability and decreases in viscosity whereby application under heat and pressure causes the adhesive sealant component 10 to flow freely into linear seams and other gaps and crevices proximate to the linear seam to be sealed. Minor amounts of pressure of about 10 to 20 pounds and preferably about 15 pounds per square inch, more or less, can be applied by a hand-held roller if desired, while useful application temperatures are between about 0° C. and about 90° C. at the membrane.

Referring now to the external linear side strip 14,16 of the multicomponent sealing tape 10, the side strip 14,16 comprise dimensionally stable, sealing tape strips of elastomeric rubber. Preferred elastomeric side strips 14,16 comprise partially or lightly crosslinked tacky carbon black reinforced seaming compound containing a polymeric blend of butyl rubber and polyisobutylene, as more particularly disclosed in U.S. Pat. No. 4,601,935, and hereby fully incorporated by reference. The butyl rubber and polyisobutylene polymeric blend can contain from about 40 percent to 60 percent by weight copolymerized isobutylene and can be mixed with conventional or desired additives such as carbon black, plasticizers, pigments, tackifiers, softeners, and a low temperature curing agent such as a p-quinone dioxime.

The multicomponent sealing tape 10 of the present invention comprising laterally spaced, linear side strips 14,16 interconnected with the intervening raised adhesive sealant central strip 12, 13, 18, or 19 can be produced by a dual extrusion process as illustrated in FIG. 8.

In the preferred process, a plurality of extruders 40,42,44 are coordinated to simultaneously extrude under heat and pressure ribbon-shaped extrudate comprising a pair of laterally spaced side strips 14,16 in conjunction with an interposed soft center strip 12, where the three heated extrudate strips 12,14,16 fuse together linearly to form a composite multicomponent sealant tape 10 as shown in FIG. 4. The continuously extruded strips 12,14,16 are extruded onto release paper 36 continuously progressing forward on a conveyor belt 46 whereupon the composite sealing tape 10 can be either rolled up in a roll or cut to length, as desired. Alternatively, the soft center strip 12 can comprise heated, soft, elastomeric, precasted strips or continuously coated strips which are subsequently joined with side strips 14,16 to form a composite sealing tape 10.

The multicomponent sealing tape 10 of the present invention is particularly useful for sealing linear seams of roofing materials and particularly sheet roofing materials known as roofing membrane made from ethylenepropylene non-conjugated diene rubbery terpolymer (EPDM) and manufactured in large sheets. The EPDM can be from 5 to 40 feet wide or larger and about 100 feet or more long. A similar elastomeric polymer obtained by copolymerization of ethylene and propylene to form a copolymer having at least 50 percent by weight copolymerized ethylene and known as EPM can also be used to form a roofing membrane.

In manufacturing the elastomeric sheet membranes, ordinarily the polymeric materials are blended with desired fillers, coloring agents, extenders, vulcanizing or crosslinking agents, antioxidants, and other compounding materials which form a resinous compound which can be calendered or extruded into thin sheets typically at about 1.5 millimeter thickness followed by heating at about 150° C. for about 2 hours to effect vulcanization of the sheet to produce a roofing membrane material.

In accordance with the present invention, the multicomponent sealing adhesive tape 10 is applied to a linear seam of lapped or butting roofing membrane or similar seamed substrate materials. The multicomponent sealing tape 10 is linearly aligned with the linear seam with flowable, raised center component 12, 13, 18, or 19 comprising resinous sealant adhesive linearly aligned directly above the linear substrate seams with the linear side strips 14,16 linearly aligned laterally adjacent to the linear seam. After proper alignment of the multicomponent sealing tape 10 with the substrate seam, heat and pressure are applied to the sealing tape 10 and particularly to the raised profile center strip of flowable sealant adhesive to cause the flowable sealant adhesive strip to flow and penetrate into the seam crevice as well as other seam edge or groove gaps and imperfections. If desired, mild pressure of up to about 25 and desirably about 15 pounds per square inch can be applied, typically with a hand-held roller at application temperatures between about 0° C. and about 90° C. at the membrane. Heat can be applied by a hand-held heating device. As pressure and heat are applied to the sealing tape 10, the raised center profile of flowable sealant adhesive becomes depleted from the center portion 12, 13, 18, or 19 of the sealing tape 10 whereby the substrate seam becomes completely sealed and the flow of sealing adhesive center 12, 13, 18, or 19 stops. Preferred sealing tape 10 embodiments of the present invention will advantageously seal by flowing sealing adhesive strip 12, 13, 18, or 19 gaps as small as 0.05 inch at application temperatures of about 70° C.

The merits of the present invention are further shown by the following illustrative examples:

EXAMPLE 1

A multicomponent sealing tape was prepared in accordance with the present invention by simultaneously extruding three extrudate ribbons comprising a center strip disposed between two side strips where the three strips were linearly fused together to provide a composite sealing tape as shown in FIG. 1. Each extruded ribbon strip was approximately 1 inch wide, while the side strips were about 30 mils thick and the center strip was about 40 mils thick.

The two extruded side strips comprised elastomeric rubber of a polymeric 50/50 blend of butyl rubber and polyisobutylene compounded with carbon black and other additives. The extruded center strip comprised a soft, flowable elastomer containing the following raw materials compounded together:

| Raw material | Wt. Parts |
| --- | --- |
| Polyisobutylene polymer | 95.5 |
| Silica | 1.5 |
| Antioxidant | 0.5 |
| Carbon black | 0.5 |
| Talc | 2.4 |

A section of the composite tape was applied to a lap seam of two EPDM roofing membranes as shown in FIG. 2, and another section of the composite tape was applied to a T-joint of three EPDM roofing membranes overlapped as shown in FIG. 3. In both applications, the composite tape was heated to about 70° C. at the substrate by a hand-held heating device and applied with about 25 psi by a hand-held roller. The sealed seams were cooled to room temperature overnight. The sealed seams were tested for water permeability and water resistance and were found to be excellent seals against water and moisture.

While in accordance with the patent statutes, the best mode and preferred embodiment has been set forth; the scope of the invention is not limited thereto, but rather by the scope of the attached claims.

What is claimed is:

1. A multicomponent sealing tape for sealing linear seams between adjacent elastomeric substrates, comprising:

a linear center strip interposed between and connected along its sides with a pair of laterally spaced linear side strips, said center strip being at least 10 percent larger in thickness than each of said side strips;

said center strip consisting essentially of a compounded butyl rubber adhesive sealant which is non-crosslinked, whereby said center strip exhibits good dimensional stability at room temperature and whereupon application of said sealing tape to a seam, under heat, pressure or both heat and pressure, said center strip flows freely into and seals said seam;

said side strips consisting essentially of a compounded elastomeric rubber composition which is at least partially crosslinked, whereby said side strips exhibit resilience and dimensional stability at both room temperature conditions and upon application of heat, pressure or both heat and pressure;

and wherein said tape is preassembled, whereby said side strips are adhered to said center strip prior to application of said tape to said seam.

2. The sealing tape of claim 1, wherein the sealing tape is adapted to be applied to the substrate seam under pressure of about 10 to 20 pounds per square inch.

3. The sealing tape of claim 1, wherein the sealing tape is applied to the substrate seam at an applied pressure of up to about 25 pounds per square inch.

4. The sealing tape of claim 1, wherein the sealing tape is adapted to be applied to a substrate seam at temperature between about 0° C. and about 90° C.

5. The sealing tape of claim 1, wherein said butyl rubber copolymer has a molecular weight from about 10,000 and to about 100,000.

6. The sealing tape of claim 5, wherein the molecular weight is between about 10,000 and 15,000.

* * * * *